(12) United States Patent
Jasso et al.

(10) Patent No.: US 10,051,019 B1
(45) Date of Patent: Aug. 14, 2018

(54) SYSTEM AND METHOD FOR SESSION MANAGEMENT

(71) Applicant: Wells Fargo Bank, N.A., San Francisco, CA (US)

(72) Inventors: Manuel Jasso, San Francisco, CA (US); Arnaud Versini, Concord, CA (US); Ryan Van Oss, Oakland, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 441 days.

(21) Appl. No.: 13/794,651

(22) Filed: Mar. 11, 2013

Related U.S. Application Data (60) Provisional application No. 61/724,411, filed on Nov. 9, 2012.

(51) Int. Cl.
*G06F 3/048* (2013.01)
*H04L 29/06* (2006.01)

(52) U.S. Cl.
CPC .............................. *H04L 65/1083* (2013.01)

(58) Field of Classification Search
None
See application file for complete search history.

(56) References Cited

U.S. PATENT DOCUMENTS

| | | | |
|---|---|---|---|
| 7,343,486 B1 * | 3/2008 | McCarty | H04L 63/0815 713/151 |
| 7,600,027 B2 | 10/2009 | Yan | |
| 7,664,860 B2 | 2/2010 | Beck et al. | |
| 7,702,999 B1 | 4/2010 | Sperr et al. | |
| 7,861,289 B2 | 12/2010 | Meyer et al. | |
| 7,921,208 B2 | 4/2011 | Hochwarth et al. | |
| 8,051,180 B2 | 11/2011 | Mazzaferri et al. | |
| 8,108,517 B2 | 1/2012 | Kalavade | |
| 2002/0147777 A1 | 10/2002 | Hackbarth et al. | |
| 2004/0015563 A1 | 1/2004 | Cotte | |
| 2004/0193699 A1 | 9/2004 | Heymann et al. | |
| 2006/0059556 A1 * | 3/2006 | Royer | G06F 9/485 726/22 |
| 2006/0089990 A1 | 4/2006 | Ng et al. | |

(Continued)

OTHER PUBLICATIONS

Peterson, Kyle, Session Timeout Warning Popup for Multiple Tabs, Aug. 26, 2012, https://codebit.wordpress.com/2012/08/26/session-timeout-warning-popup-for-multiple-tabs/.*

(Continued)

*Primary Examiner* — William C Trapanese
(74) *Attorney, Agent, or Firm* — Foley & Lardner LLP (57) ABSTRACT

A client device generates a plurality of application windows. For example, a first application window may be provided by a first application that has a first session established with a server system, and a second application window may be provided by a second application that has a second session established with the server system. The client device detects user activity in the first window. Based on the user activity in the first window, the client device sends a message to the server system. The message providing an indication of user activity in one or more of the plurality of windows. The message causes the server system to maintain the second session as active despite inactivity in the second application window.

23 Claims, 5 Drawing Sheets

(56) References Cited

U.S. PATENT DOCUMENTS

| | | |
|---|---|---|
| 2006/0143217 A1 | 6/2006 | Stanev et al. |
| 2006/0212589 A1* | 9/2006 | Hayer et al. .................. 709/229 |
| 2008/0163063 A1 | 7/2008 | Bonev et al. |
| 2010/0242106 A1 | 9/2010 | Harris et al. |
| 2011/0047566 A1 | 2/2011 | Matuchniak et al. |
| 2012/0240060 A1* | 9/2012 | Pennington ........... G06F 1/1618 |
| | | 715/753 |

OTHER PUBLICATIONS

Johnston, Paul, Authentication and Session Management on the Web, SANS Institute, GIAC Security Essentials Certification Practical Assignment Version 1.4b, Nov. 28, 2004, 33 pages.

\* cited by examiner

SYSTEM AND METHOD FOR SESSION MANAGEMENT

CROSS-REFERENCE TO RELATED PATENT APPLICATIONS

This application claims priority from U.S. Provisional Application No. 61/724,411, filed Nov. 9, 2012, entitled "SYSTEM AND METHOD FOR SESSION MANAGEMENT", incorporated herein by reference in its entirety.

BACKGROUND

Multiple internet applications are sometimes offered via a common portal to provide users with a plurality of different tools or other services. The applications may be accessed in different windows and may communicate with multiple servers in order to support the services. The different applications may communicate with the multiple servers at different times and the servers may disconnect from the one or more applications at different times based on the user's inactivity in each window. The servers may disconnect with inactive windows for security reasons in order to prevent an unauthorized person from fraudulently accessing the server or the application.

SUMMARY OF THE DISCLOSURE

According to one example embodiment, a client device generates a plurality of application windows. For example, a first application window may be provided by a first application that has a first session established with a server system, and a second application window may be provided by a second application that has a second session established with the server system. The client device detects user activity in the first window. Based on the user activity in the first window, the client device sends a message to the server system. The message providing an indication of user activity in one or more of the plurality of windows. The message causes the server system to maintain the second session as active despite inactivity in the second application window.

DETAILED DESCRIPTION

Figure 1:
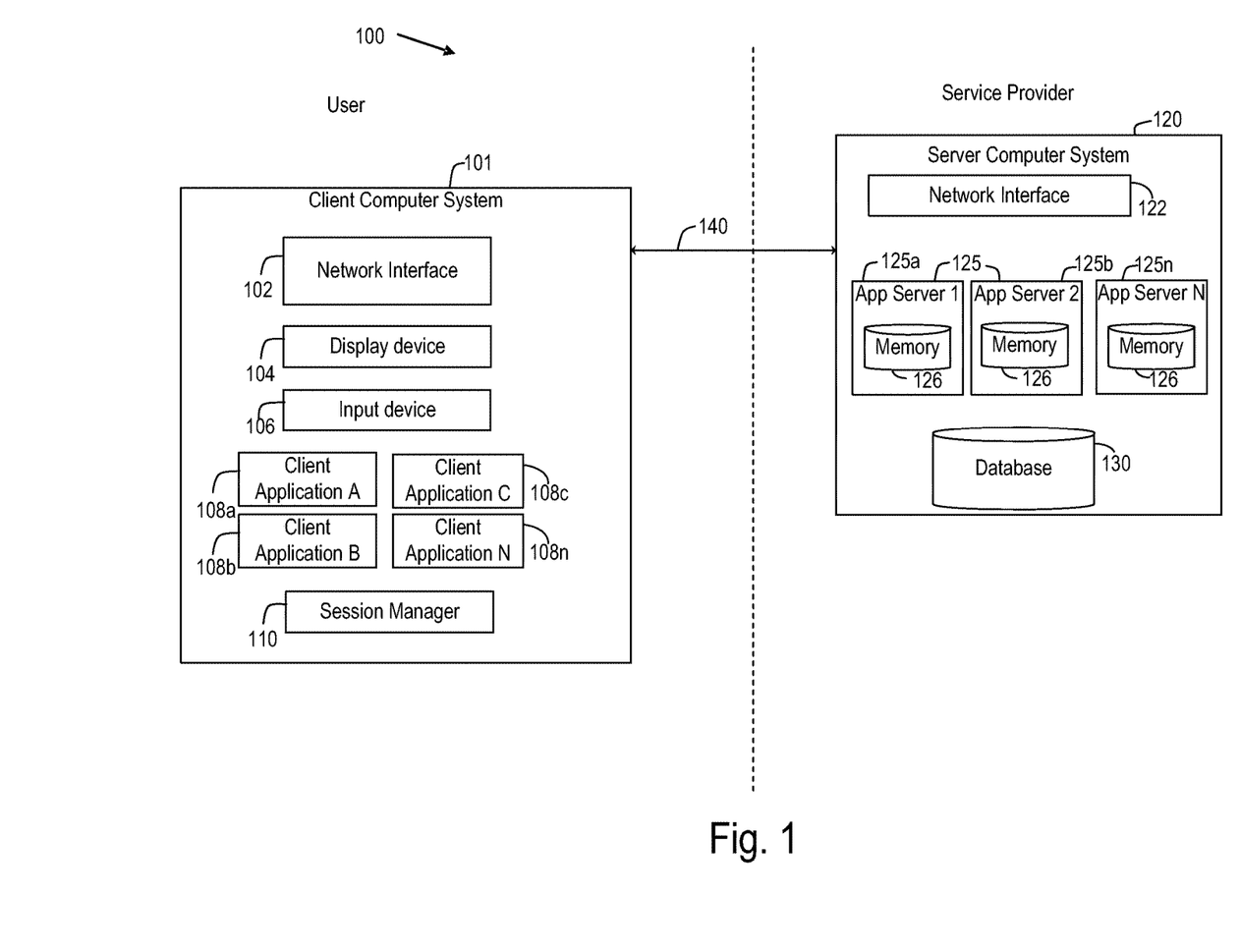
FIG. 1 is a schematic diagram of a computer-implemented data processing system according to an example embodiment.

Referring to FIG. 1, a computer-implemented data processing system 100 is shown that may be used by a client computer system 101 to receive services from a server computer system 120. In one embodiment, the server system 120 may be provided by a financial institution and may provide access to services of the financial institution. The server system 120 may include a plurality of application servers 125 that provide such services to a user. The client computer system 101 and the server system 120 may communicate through a network 140, which may include one or more of the Internet, cellular network, Wi-Fi, Wi-Max, a proprietary banking network, and so on.

The client computer system 101 may, for example, be a desktop computer, a laptop computer, a tablet device, a mobile handheld wireless device (e.g., cellular phone, portable gaming device, etc.), and so on. The client computer system 101 may comprise one or more processors that execute instructions that are stored in the memory. The processors may perform operations described herein associated with logic or processes shown in FIGS. 2 through 5b. Examples of operating systems that may be executed on the client computer system 101 include iOS®, Windows Phone®, Symbian®, Android®, Blackberry®, WebOs®, Windows®, OS/X and so on.

The client computer system 101 comprises a network interface 102, display device 104, input device 106, one or more client applications 108, and a session manager 110. Network interface 102 may include, for example, hardware that connects the client computer 101 to the network 140.

The display device 104 may be operable to display images for the user of the client computer system 101. For example, the client applications 108 may generate display windows that prompt the user to provide information and that are used to receive the information provided by the user. The display windows may be generated by the client applications 108 as part of user sessions during which the user interacts with the servers 125 to access services of the financial institution.

The input device 106 may be used to receive inputs from the user. For example, the input device 106 may receive inputs in connection with the display windows generated by the client applications 108. The input device 106 may be one or more of a keyboard, touch screen, pointing device (e.g., mouse, trackball, etc.), microphone, and so on. The input from the various input devices may be tracked by the client application 108 in which the input occurs. When inputs are received via the input device 106, visual feedback regarding such inputs may be provided via the display windows using the display device 104.

The client applications 108 provide access to services offered via the servers 125. The client applications 108 may be accessed via a web browser or other software with a connection to the network 140. In some embodiments, the client applications 108 may include an application that provides a login screen, an application that provides a root window, and applications that provide access to other services provided by the servers 125. In some embodiments, one or more of these operations may be combined (e.g., the same application may be used to provide the root window and the login screen).

The client applications 108 may be published to the client computer system 101 by the servers 125 using the network 140. In some embodiments, the client applications 108 may be used to perform banking tasks such as making deposits, tracking expenses, initiating transfers, managing finances, and so on. The number of other client applications 108 available to access the servers 125 may be in the tens, hundreds, thousands or more. In practice, any specific user might only utilize a handful of the client applications 108 that are available, and hence less than all of the available client applications may have been downloaded onto the client computer system 101. In some embodiments, a thick client configuration may be utilized. In other embodiments, a thin client configuration may be utilized.

The client applications 108 may communicate with an application server 125 using the network interface logic 102. The client applications 108 may receive user input and provide data to an application server 125. The client applications 108 may also receive data from the application server 125 in response to user activity in session windows. In response to the user activity, the application server 125 may continue to retain client application session data and maintain a connection with the client application 108.

The session manager 110 may be configured to manage the sessions activated by the user via the client applications 108. As described in greater detail, in one embodiment, the session manager 110 may be configured to determine when a user is active in any one or more of the client applications 108. When the user is active in at least one of the client applications 108, then the session manager 110 may operate to cause the session for each of the remaining client applications 108 to be preserved active by the servers 125. In an example embodiment, the session manager 110 may monitor each application window and pass messages between the client applications 108 specifying the occurrence of user activity in one of the client application windows. The remaining client applications 108 in which there has been no user activity may then also communicate with the server system 120 to ensure that their sessions nevertheless remain active.

The server system 120 includes a network interface 122, application servers 125, and database 130. The server system 120 may be operated by a banking entity that maintains and handles transaction processing for various users. The application servers 125 may include application server 125*a*, application server 125*b* and so on. The servers 125 may be configured to store information regarding user accounts in a database 130. The application servers 125 may comprise one or more processors configured to execute instructions, send and receive data stored in memory, and perform other operations to implement the operations described herein in connection with FIGS. 2 through 5*b*. The servers may be separate physical servers or maybe logical servers.

Figure 2:
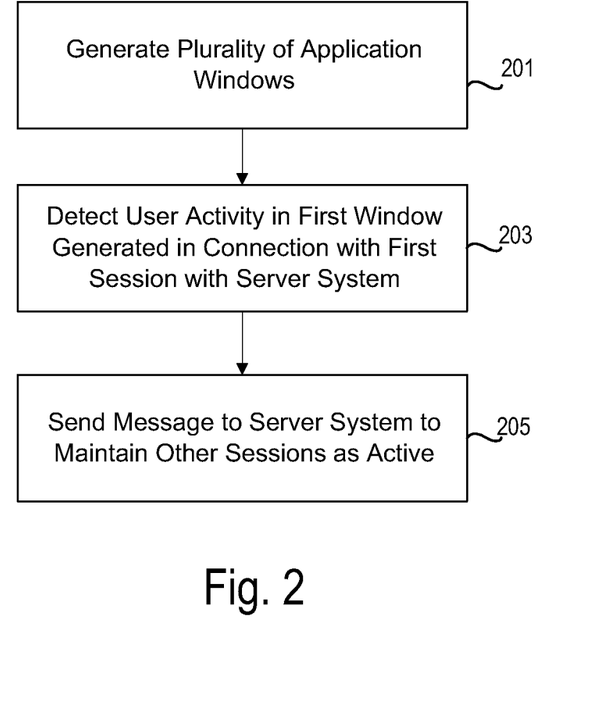
FIG. 2 is an example process implemented by the data processing system of FIG. 1 to synchronize a server connection from a plurality of client computer windows that are associated with a client application.

Referring now to FIG. 2, FIG. 2 is an overview of a process that can be implemented by the data processing system 100 of FIG. 1. In FIG. 2, the server sessions for a plurality of client application windows are synchronized such that the sessions terminate (or do not terminate) as a group. Hence, if a user has a number of active sessions, but is active in only one of the sessions, the other sessions remain active, as well.

At step 201, the client computer system 101 generates a plurality of application windows including, for example, a first application window and a second application window. The first application window may be provided by a first application 108*a* that has a first session established with the server system 120. Likewise, the second application window may be provided by a second application 108*b* that has a second session established with the server system 120.

At step 203, the session manager 110 detects user activity in one of the application windows. For example, activity may be detected in the first application window. At step 205, based on the user activity in the first window, the session manager 110 sends a message to the server system 120. The message causes the server system 120 to maintain the second session as active despite inactivity in the second application window. For example, even though there has not been activity in the second application window, the message may provide an indication that there has been user activity in one or more of the other windows, such as the first application window. Based on the activity in the other windows, the server system 120 may maintain the second session as active.

The arrangement of FIG. 2 allows multiple associated server sessions that a user may have open with the server system 120 to be synchronized. Specifically, activity in one window may be effectively propagated to other windows so that none of the sessions are terminated, so long as the user is active in at least one of the sessions. Hence, a user that accesses a suite of applications through a common portal may be provided with a more consistent experience in each of the application windows.

Figure 3:
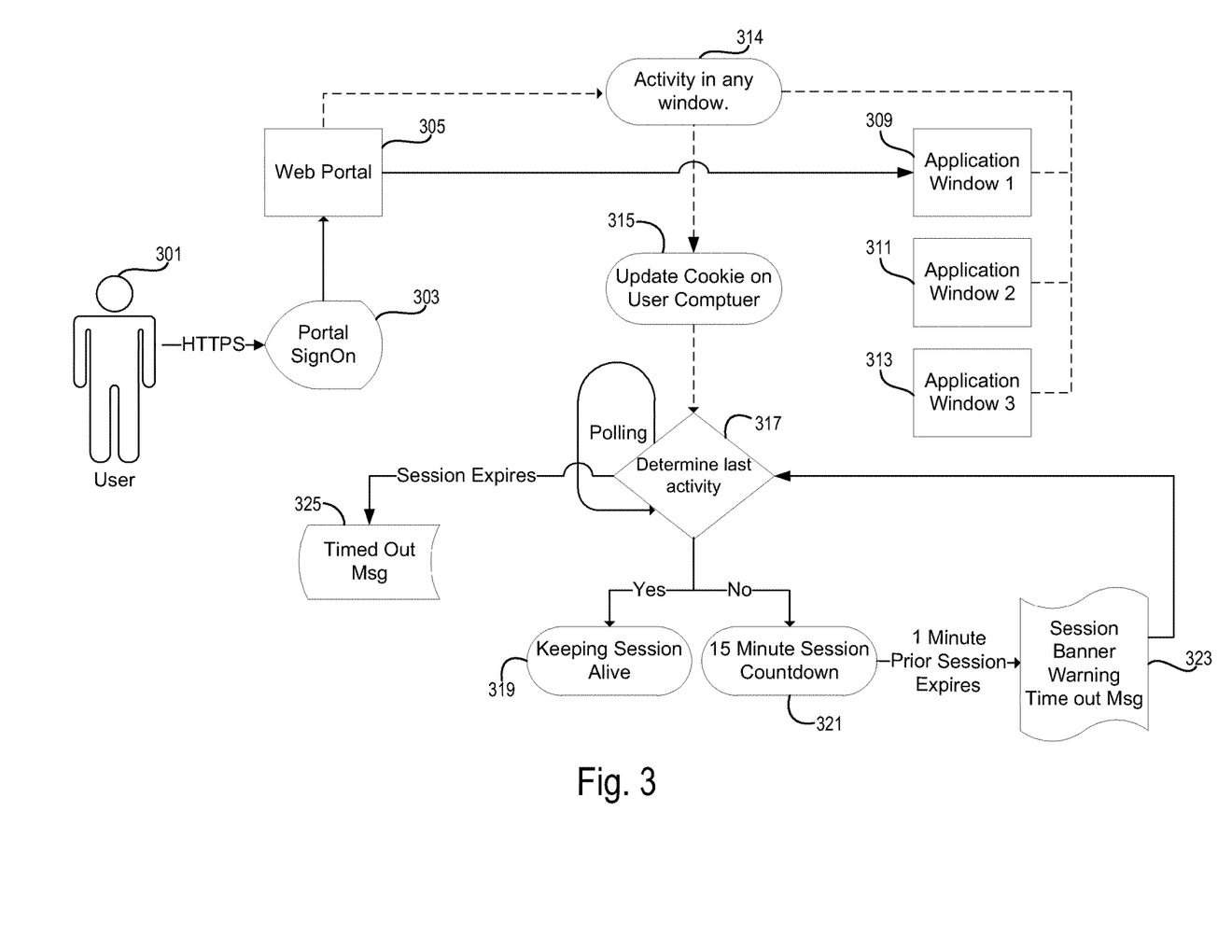
FIG. 3 is an example process implemented by the data processing system of FIG. 1 to synchronize a server connection from a plurality of client computer windows associated with a client application.

FIG. 3 is a more detailed example of a process flow that may be implemented by the data processing system 100 of FIG. 1 to synchronize server connections for a plurality of client application windows. In FIG. 3, it may be noted that blocks 301-305 represent a user logging in at a portal, blocks 309-313 represent application windows, and blocks 314-325 represent operations performed in connection with each of the active sessions associated with the application windows 309-313. Operations 314-325 are performed by each of the application windows 309-313 to ensure that their respective sessions are maintained active or terminated by the servers 125, as appropriate, based on the user activity. Although a particular order of operations is depicted, it will be appreciated the operations shown in FIG. 3 may be performed concurrently with each other.

As shown in FIG. 3, a user 301 using client computer system 101 may provide authentication credentials at a login screen 303 to gain access to a web portal 305. After signing into the web portal 305, the user may access various client applications 108 that generate application windows 309, 311, and 313. The client application windows 309, 311, 313 may be considered as being associated with each other by virtue of being accessible via a common portal (e.g., web portal 305), having login credentials that may be propagated between the windows, and/or in another fashion. For example, in one embodiment, the user may utilize a web browser to login via the login screen, be delivered to a root window (portal home page), and from there gain access other applications to access the services provided by the servers 125. In such a single sign-on arrangement, the user may be prompted to provide login credentials only once and the login credentials may be stored and propagated to the other applications 108 as they are activated. The user is not required to login again when new sessions are initiated via other respective client applications 108.

When the applications 108 are accessed, the session manager 110 may also be activated. In one embodiment, the session manager 110 is implemented separately from the client applications 108. In other embodiments, the session manager 110 is integrated with the client applications 108. For example, code that implements that session manager 110 may be separately incorporated into each of the client applications 108. As another example, separate instances of the code that implements that session manager 110 may be initiated by each of the client applications 108 when they are activated. Hence, the session manager 110 may comprise program modules that operate independently but in collaboration with each other to cause synchronization of the application windows 309, 311 and 313. For purposes of description, certain operations below will be described as being performed by the application windows 309, 311, 313, with the understanding that such operations may be performed by portions of the session manager 110 associated with the respective application window 309, 311, or 313.

At step 314, user activity is detected in one or more the application windows 309, 311 and 313. In example embodiments, the user activity can include a key press, mouse click, scroll input. For a touch screen interface, the user activity may include a single or multiple finger touch, gesture or movement. In example embodiments, user activity can include voice input that is received by the client computer system 101. The user activity may be detected by the windows 309, 311 and 313 based on information provided by a device operating system or in another manner.

At step 315, a message is passed between the application windows 309, 311, 313 regarding the user activity. In one embodiment, the message is passed using a cookie on the client computer system 101 as a messaging mechanism. For example, the cookie may be writable/readable by each of the application windows 309, 311, 313, such that information may be written to the cookie by one of the windows 309, 311, 313 and subsequently read by the remaining application windows. In other embodiments, other messaging mechanisms may be used. For example, the message may be passed using a messaging protocol available in browser software of the client computer system 101, or in another manner.

Assuming by way of example that a cookie is used to pass messages, then step 315 may comprise updating a cookie on the client computer system 101. For example, the application window(s) 309, 311, 313 in which the user activity occurred may write a time stamp to the cookie indicating the time of the last detected user activity. Activity in any one of the application windows 309, 311, 313 may cause the time stamp value for the most recent activity to update in the cookie. As will be appreciated, in the case of continuous activity in one of the application windows 309, 311, 313, it may not be considered necessary to update the cookie continuously (e.g., with every keystroke). Rather, it may be considered sufficient to update the cookie at spaced regular intervals (e.g., every few seconds).

At step 317, the time of the last activity is determined by the application windows 309, 311, 313. For example, in an embodiment where a cookie is used to pass messages between the application windows 309, 311, 313, then a polling arrangement may be used. For example, the application windows 309, 311, 313 may each poll the cookie on a periodic basis (e.g., every few seconds) to determine when the last user activity occurred in any of the application windows 309, 311, 313.

At step 319, based on the user activity, a ping message may be sent to the server system 120 in connection with the application windows 309, 311, 313. For example, after a period of inactivity, if activity is detected at step 317, then at step 319 a ping may be sent to the servers 125 in connection with each of the application windows 309, 311, 313. For example, if there has been activity in application window 309, then application 309 may have updated the cookie at step 315. Application windows 311 and 313 may have also detected the new activity at step 317 based on polling the cookie. Then, at step 319, each of the application windows 309, 311, 313 may send a ping message to each of their respective servers 125 to keep their respective session active. Hence, even though there has not been activity in the application windows 311 and 313, the ping message may provide an indication to the servers 125 that there has been user activity in another window. Based on the activity in application window, the server system 120 may maintain the sessions for application windows 311 and 313 as active as well.

In an example embodiment, in order to reduce network traffic, such messages are sent to the servers 125 at predetermined intervals rather than continuously. In an example embodiment, the duration of such intervals is less than the session timeout delay. For example, if the session timeout delay is fifteen minutes, then the ping messages may be sent at ten minute intervals, for example. Hence, to reduce network traffic, even though step 319 may be performed every few seconds to determine whether to send a ping message, ping messages may be sent to the servers 125 on a less frequent basis.

At step 321, based on the user activity (or, more specifically, non-existence thereof), an inactivity alert message may be sent to the server system 120 in connection with the application windows 309, 311, 313. For example, each of the application windows 309, 311, 313 may poll the cookie to determine whether the user has been inactive for a predetermined period of time (e.g., 30 seconds of idle time). For example, the most recent timestamp in the cookie may indicate that it has been more than thirty seconds since user activity has been detected. In such a situation, the period of inactivity may be detected by the application windows 309, 311, 313. In response, the application windows 309, 311, 313 may each send an inactivity alert message to the respective server 125 that is hosting their session. As will be apparent, if the user has been inactive, but the period of inactivity has not reached thirty seconds, then an inactivity alert message may not be sent.

In an example embodiment, as previously indicated, a session timeout delay is utilized, e.g., a fifteen minute session timeout delay. In such an arrangement, the inactivity alert message that is sent at step 321 may initiate a count down timer at the server 125 that receives the message. If the count down timer expires without any further activity, then the server 125 may terminate the session. On the other hand, if more user activity is detected, then a ping message may be sent to the server 125 at step 319, causing the countdown timer to cease operation. The countdown timer may reinitiate if another thirty seconds of inactivity is detected and another inactivity alert message is sent at step 321. In this manner, the countdown timer may often count towards zero, but may not ever reach zero if user activity is again detected in one or more of the application windows 309, 311, 313.

In one embodiment, at step 323, a warning timeout message may be shown to the user. The warning timeout message may, for example, be shown at a predetermined time prior to expiration of the countdown timer (e.g., one minute prior to expiration of the countdown timer). The warning timeout message may include a countdown timer that may be displayed to the user. In one embodiment, the content in each window is made inaccessible window while the session banner is being displayed. If the user attempts to select the content in one of the windows, the user activity is detected and, at step 319, the session is kept alive by sending a ping to the server 125 for each application window 309, 311, 313. If there is no user activity for one minute, then the session expires and the time out message is displayed in step 325.

After session timeout, the user may be returned to the portal sign on 303. In one embodiment, as part of displaying the session timeout message at step 325, the content that was displayed in the windows 309, 311, 313 may be made inaccessible, e.g., deleted from the user's screen. In this manner, sensitive information may be made inaccessible, e.g., if the user is no longer at the computer system 101 and another (e.g., potentially fraudulent) individual gains access to the computer system 101.

It may be noted that operation of the application windows 309, 311, and 313 is synchronized. That is, assuming each of the application windows 309, 311, and 313 is polling the cookie every few seconds at step 317, then operation of the application windows 309, 311 and 313 will be synchronized. For example, none of the sessions associated with the application windows 309, 311 and 313 will terminate so long as the user is active in at least one of the application windows 309, 311 and 313. Further, when a warning banner is displayed, it shows up in each of the application windows 309, 311, 313 at about the same time (e.g., within a few seconds of each other, assuming the cookie is being polled every few seconds). Further, when one of the application windows 309, 311, 313 terminates, the others will all terminate at about the same time (e.g., within a few seconds of each other, assuming the cookie is being polled every few seconds). After the application windows 309, 311, 313 terminate, the user is then delivered to the portal sign on 303, which provides a consistent/common interface for accessing the application windows 309, 311, 313. Hence, consistency of the user experience across the set of associated application windows is enhanced.

By way of example, a user may be working in a first application window, and that application window causes a second application window to open to permit the user to perform a task. For example, the user may be required to fill out a form. In some cases, the task to be performed in the second application window may take a substantial amount of time to complete, e.g., an amount of time that is in excess of the session timeout delay. During this time, in the example arrangement of FIGS. 1-3, the first application window will nevertheless remain open (and will not time out) so long as the user continues working on the task in the second application window. The user is thereby provided with consistent experience across the two application windows.

It may also be noted that, according to example embodiments, the user activity that keeps the application windows 309, 311 and 313 active may be simply keystrokes, mouse movements, and so on. The user activity need not be of the type that involves direct interaction between the client computer system 101 and one of the servers 125.

Figure 4A:
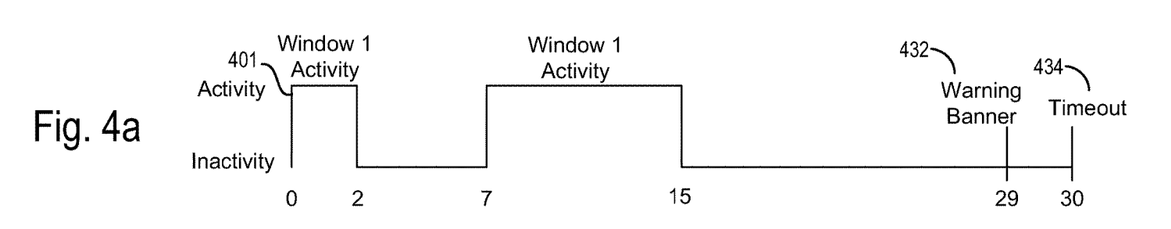
FIG. 4a is an example user activity timing diagram for a first window.
Figure 4B:
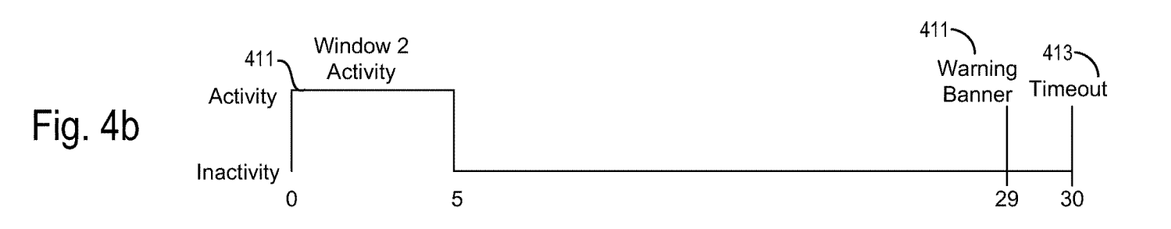
FIG. 4b is an example user activity timing diagram for an example second window.
Figure 4C:
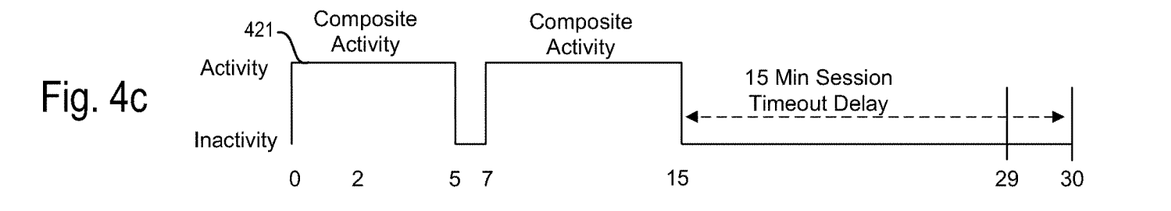
FIG. 4c is an example composite user activity timing diagram for the windows of FIGS. 4a and 4b.

Referring now to FIGS. 4*a*-4*c*, an example of operation of the system of FIGS. 1-3 is shown. FIG. 4*a* is a timing diagram showing user activity in a first application window, and FIG. 4*b* is a timing diagram showing user activity in a second application window. FIG. 4*c* is a composite timing diagram showing user activity in the first and second windows. For purposes of providing an example, it is assumed in FIGS. 4*a*-4*c* that a fifteen minute session timeout delay is used and that a warning banner is posted when one minute remains before the session is set to expire.

As shown in FIG. 4*a*, the user is active in the first window during the time period extending from T=0 to T=2 minutes and also during the time period extending from T=7 minutes to T=15 minutes. As shown in FIG. 4*b*, the user is active in the second window during the time period extending from T=0 to T=5 minutes. As shown in FIG. 4*c*, on a composite basis, the user is active in one of the windows during the time period extending from T=0 to T=5 minutes and also during the time period extending from T=7 minutes to T=15 minutes.

With reference again to 4*a*, user activity starts at T=0 minutes and stops temporarily at T=2 minutes. Given that the session timeout delay is fifteen minutes, the session in the first window does not terminate but rather is still active when the user returns to the first window at T=7 minutes. The user again engages in activity in the first window from T=7 minutes to T=15 minutes. After T=15 minutes, there is no further activity in the first window. Hence, the session terminates after the fifteen minute session timeout delay has elapsed. A warning message may be displayed (e.g., starting at one minute in advance of the expiration of the session timeout delay) to warn the user that the session is about to elapse if no further activity occurs. After the session terminates, the user may be taken to a login screen and may be required to login again to resume using the applications 108.

With reference again to 4*b*, the last user activity in FIG. 4*b* occurs at T=5 minutes. Despite the fifteen minute session timeout delay, the session in the second window does not expire at T=20 minutes. Rather, based on the user activity in the first window, a message is sent to the server system 120 in connection with the second window. The message provides an indication of user activity in another window other than the second window. The message causes the server system 120 to maintain the second session as active despite the inactivity in the second window.

Figure 5A:
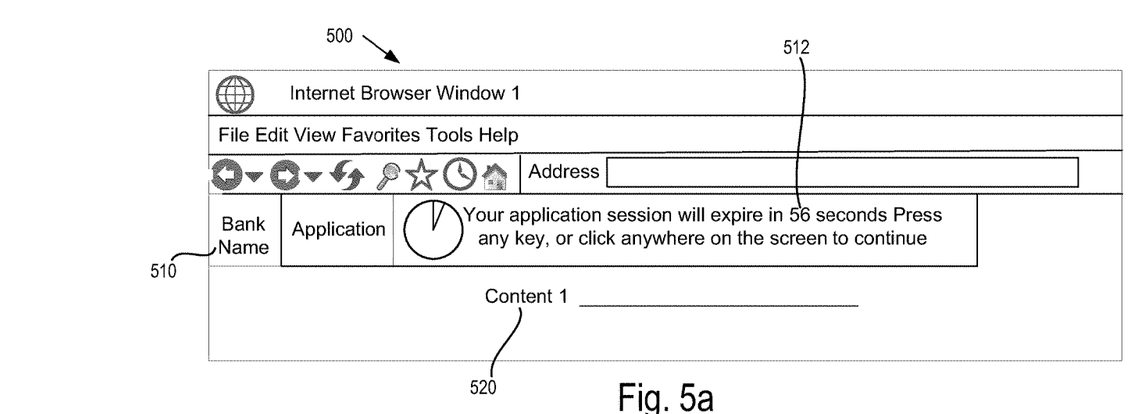
FIG. 5a is a screen shot showing an example banner that may be displayed when a first window is preparing to disconnect from the server.
Figure 5B:
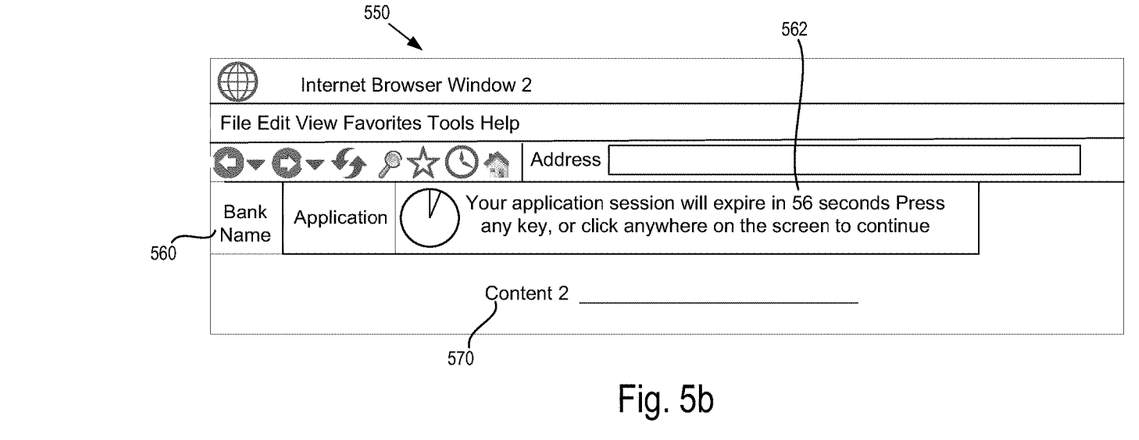
FIG. 5b is a screen shot showing an example banner that may be displayed when a second window is preparing to disconnect from the server.

Referring now to FIGS. 5*a* and 5*b*, FIGS. 5*a* and 5*b* show example screen shots that may be shown to the user, for example, in the context of the session timeout process depicted in FIGS. 4*a*-4*c*. FIG. 5*a* is a screen shot 500 showing a first window with a warning banner 510 that may be displayed in a first window. Warning 510 may be displayed after the user has been inactive for 14 minutes. Prior to termination of the session with the server system 120, a countdown timer 512 may be shown in warning 510. Performing activity on any portion of the screen with the window that is displaying the warning reset the inactivity timer and remove the warning from each of the windows that are displaying the warning. In other embodiments, the content that was being displayed in the window prior to the warning being displayed in the window may be retrieved fro the server or retrieved from client computer and restored in the respective window. Also shown in warning 510 is a button 514 that allows a user to close the warning 510 and reset the inactivity timer. The warning 510 is configured to move the content 520 or the warning 510 may cover a portion of the content 520. As shown in FIG. 5*b*, a similar warning 560 may be shown in the second window. The warning 510 and 560 appear in both internet browser windows simultaneously and upon receiving user input the warnings 510 and 560 are removed simultaneously.

The embodiments are described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon.

Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

As previously indicated embodiments be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments discussed above may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:
1. A method, comprising:
generating, by a client device, a plurality of application windows, the plurality of application windows including a first application window and a second application window, the first application window being provided by a first application that has a first session established with a server system, and the second application window being provided by a second application that has a second session established with the server system;
detecting, by the client device, user activity in the first application window;
updating, by the first application, a messaging mechanism configured to indicate user activity or inactivity with information regarding the user activity detected in the first application window;
detecting, by the client device, user inactivity in the second application window;
polling, by the second application, the messaging mechanism to obtain information about user activity in the first application window;
obtaining, by the second application, the information regarding the user activity detected in the first application window via the polling of the messaging mechanism;

sending, by the second application, an activity message to the server system, the activity message based on the detected user activity in the first application window; and maintaining, in response to the activity message being sent by the second application, a synchronous operation of each of the first session and the second session as active despite the user inactivity detected in the second application window;

terminating each of the first session and the second session synchronously after a predetermined period of inactivity absent an activity message providing an indication of user activity in the first application window and the second application window being sent to the server system from the client device;

wherein the client device is structured to display a warning message in each of the plurality of windows according to the user activity; and wherein sensitive information in each of the first application window and second application window is made inaccessible in response the first session and second session being terminated.

2. The method of claim 1, wherein the user activity comprises at least one of a keystroke, mouse click, tough gesture and window scrolling within at least one of the plurality of windows.

3. The method of claim 1, further comprising storing a time stamp corresponding to a most recent user activity, and wherein the time stamp is accessible to by the first and second applications.

4. The method of claim 3, further comprising
comparing the time stamp with a current time;
determining that the most recent user activity occurred prior to a pre-determined time period; and
displaying the warning message in each of the plurality of application windows.

5. The method of claim 4, wherein the warning message includes a countdown timer corresponding to an expiration of the predetermined period of inactivity and a selectable button to stop the countdown timer.

6. The method of claim 5, further comprising:
receiving user input selecting the selectable button;
removing the warning message from each of the plurality of application windows; and
resetting the user activity time stamp.

7. The method of claim 5, further comprising:
changing, after the countdown timer reaches zero, the content of each of the plurality of application windows to be different than the content that was being displayed prior to displaying the warning message.

8. The method of claim 1, further comprising sending, by the client device, based on user inactivity being detected in each of the first application window and the second application window, an inactivity message to the server system, the inactivity message providing an indication that there has been no user activity in the plurality of application windows for a predetermined period of time.

9. The method of claim 1, further comprising propagating information about the user activity to each of the plurality of application windows.

10. A method, comprising:
generating, by a client device, a plurality of application windows, the plurality of application windows including a first application window and a second application window, the first application window being provided by a first application that has a first session established with a server system, and the second application window being provided by a second application that has a second session established with the server system;

detecting, by the client device, user activity in the first application window;

updating, by the first application, a messaging mechanism configured to indicate user activity or inactivity with information regarding the user activity detected in the first application window;

detecting, by the client device, user inactivity in the second application window;

polling, by the second application, the messaging mechanism to obtain information about user activity in the first application window;

obtaining, by the second application, the information regarding the user activity detected in the first application window via the polling of the messaging mechanism;

sending, by the second application, an activity message to the server system, the activity message based on the detected user activity in the first application window;

maintaining, in response to the activity message being sent by the second application, a synchronous operation of each of the first session and the second session as active despite the user inactivity detected in the second application window;

upon detecting user inactivity in each of the plurality of application windows for a predetermined amount of time, generating a warning message in a portion of each of the plurality of application windows;

wherein the warning message is configured to inform the user that each session between the server system and the plurality of application windows will be disconnected within a time period corresponding to an expiration of the predetermined period of inactivity;

terminating each of the sessions synchronously after a predetermined period of inactivity absent an activity message providing an indication of user activity in any of the plurality of application windows being sent to the server system from the client device; and receiving, by the client device, a disconnection message from the server system confirming that each session between the plurality of application windows and the server system has been terminated after the expiration of the predetermined period of inactivity;

wherein sensitive information in each of the plurality of application windows is made inaccessible in response to each of the sessions between the plurality of application windows being terminated.

11. The method of claim 10, wherein the user activity comprises at least one of keystroke, mouse clicks, scrolling and touch gestures within at least one of the one or more of the plurality of application windows.

12. The method of claim 10, further comprising changing the content of the plurality of application windows after the server system terminates each session with the server system from content that was displayed in the plurality of application windows prior to generating the warning message.

13. The method of claim 10, further comprising storing time information corresponding to a most recently detected user activity in of the plurality of application windows.

14. The method of claim 13, further comprising updating the time information to with the latest detected user activity in the plurality of application windows.

15. The method of claim 14, further comprising comparing the time information of the latest detected user activity with a current time.

16. The method of claim 15, wherein the warning message includes a countdown timer corresponding to the expiration of the predetermined period of inactivity and a selectable button to reset the time information and stop the countdown timer.

17. The method of claim 16, further comprising:
receiving user input selecting the selectable button;
removing the warning message from each of the plurality of application windows;
resetting the time information; and
restoring the plurality of application windows to display content that was displayed in the plurality of application windows prior to the warning message being displayed.

18. The method of claim 16, further comprising:
changing the content of each of the plurality of application windows to be different than the content that was being displayed prior to displaying the warning message.

19. An apparatus, comprising:
a processor coupled to a computer-implemented storage medium, the processor configured to:
generate, by a client device, a plurality of application windows, the plurality of application windows including a first application window and a second application window, the first application window being provided by a first application that has a first session established with a server system, and the second application window being provided by a second application that has a second session established with the server system;
detect, by the client device, user activity in the first application window;
update, by the first application, a messaging mechanism configured to indicate user activity or inactivity with information regarding the user activity detected in the first application window;
detect, by the client device, user inactivity in the second application window;
poll, by the second application, the messaging mechanism to obtain information about user activity in the first application window;
obtain, by the second application, the information regarding the user activity detected in the first application window via the polling of the messaging mechanism;
send, by the second application, an activity message based on the detected user activity in the first application window to the server system;
maintain, in response to the activity message being sent by the second application, a synchronous operation of each of the first session and the second session as active despite the user inactivity detected in the second application window;
generate a warning message in the plurality of application windows when the processor detects a lack of user activity in the plurality of application windows for a predetermined period of time, wherein the warning message includes a countdown timer corresponding to an expiration of the predetermined period of inactivity; and
terminate each of the first session and the second session synchronously after a predetermined period of inactivity absent an activity message providing an indication of user activity in the first application window and the second application window being sent to the server system from the client device;
wherein sensitive information in each of the first application window and second application window is made inaccessible in response the first session and second session being terminated.

20. The apparatus of claim 19, wherein the activity message from the processor informs the server system to continue to retain session information for each one of the plurality of application windows.

21. A method, comprising:
establishing, by a server system, a plurality of sessions with a corresponding plurality of applications on a client device, the plurality of applications generating a plurality of application windows comprising a first application window and a second application window,
receiving, by the server system, an activity message from each of the first application and the second application providing an indication of user activity, the activity message from each of the first application and the second application being based on user activity being detected in the first application window and user inactivity being detected in the second application window;
maintaining, by the server system, a synchronous operation of each of the plurality of sessions as active in response to the activity message despite inactivity in the second application window; and
terminating each of the first session and the second session synchronously after a predetermined period of inactivity absent an activity message providing an indication of user activity in the first application window and the second application window being sent to the server system from the client device;
wherein the client device is structured to display a warning message in each of the plurality of windows according to the user activity; and
wherein sensitive information in each of the first application window and second application window is made inaccessible in response the first session and second session being terminated.

22. The method of claim 21, further comprising receiving, by the server system, based on user inactivity in each of the first application window and the second application window, an inactivity message from the client device, the inactivity message providing an indication that there has been no user activity in the plurality of application windows for a predetermined period of time;
counting down, by the server system, to an expiration of the predetermined period of inactivity after receiving the inactivity message; and
disconnecting, by the server system, each of the plurality of sessions after the expiration of the predetermined period of inactivity after receiving the inactivity message.

23. The method of claim 22, wherein the inactivity message is received after a predetermined idle period on the client device.

* * * * *